(12) United States Patent
Gros

(10) Patent No.: US 8,387,940 B2
(45) Date of Patent: Mar. 5, 2013

(54) ADJUSTABLE BOAT SEATS AND ACCESSORIES

(76) Inventor: Gene Gros, White City, OR (US)

(*) Notice: Subject to any disclaimer, the term of this patent is extended or adjusted under 35 U.S.C. 154(b) by 0 days.

(21) Appl. No.: 12/752,096

(22) Filed: Mar. 31, 2010

(65) Prior Publication Data

US 2011/0126753 A1 Jun. 2, 2011

Related U.S. Application Data

(60) Provisional application No. 61/265,742, filed on Dec. 1, 2009.

(51) Int. Cl.
*A47B 97/00* (2006.01)
(52) U.S. Cl. ............. 248/503; 248/221.11; 248/223.31; 248/220.31; 224/460; 224/42.4
(58) Field of Classification Search .......... 248/220.43, 248/221.11, 221.12, 223.31, 225.11, 503, 248/503.1, 506, 558, 680, 681, 220.21, 220.31, 248/220.41; 224/403, 460, 511, 325, 42.4
See application file for complete search history.

(56) References Cited

U.S. PATENT DOCUMENTS

| | | | | |
|---|---|---|---|---|
| 4,027,892 A | * | 6/1977 | Parks | 410/3 |
| 4,249,684 A | * | 2/1981 | Miller et al. | 224/42.4 |
| 4,926,953 A | * | 5/1990 | Platt | 180/68.5 |
| 5,209,477 A | * | 5/1993 | Heidel et al. | 273/143 R |
| 5,326,067 A | * | 7/1994 | Gonzalez | 248/503.1 |
| 5,395,019 A | * | 3/1995 | Christensen | 224/511 |
| 5,398,157 A | * | 3/1995 | Paul | 361/679.31 |
| 5,820,091 A | * | 10/1998 | Kutscher | 248/220.21 |
| 6,527,154 B2 | * | 3/2003 | Larsen et al. | 224/545 |
| 6,740,851 B2 | * | 5/2004 | Woodlief et al. | 219/421 |
| 7,258,260 B2 | * | 8/2007 | Hurd | 224/319 |
| 2002/0047032 A1 | * | 4/2002 | Schlecht | 224/544 |
| 2007/0215769 A1 | * | 9/2007 | Nebeker et al. | 248/220.31 |

* cited by examiner

*Primary Examiner* — Bradley Duckworth
(74) *Attorney, Agent, or Firm* — Robert J. Sayfie

(57) ABSTRACT

Relocateable boat accessories, such as seats having a second extension that can be positioned through a second extension slot, and then pivoted to position a locking member through a finger slot. The locking member can have a tip that is positioned under a floor so secure the seat to the floor. The floor may have several second extension slots and several finger slots to accommodate various accessory or seat position possibilities.

12 Claims, 8 Drawing Sheets

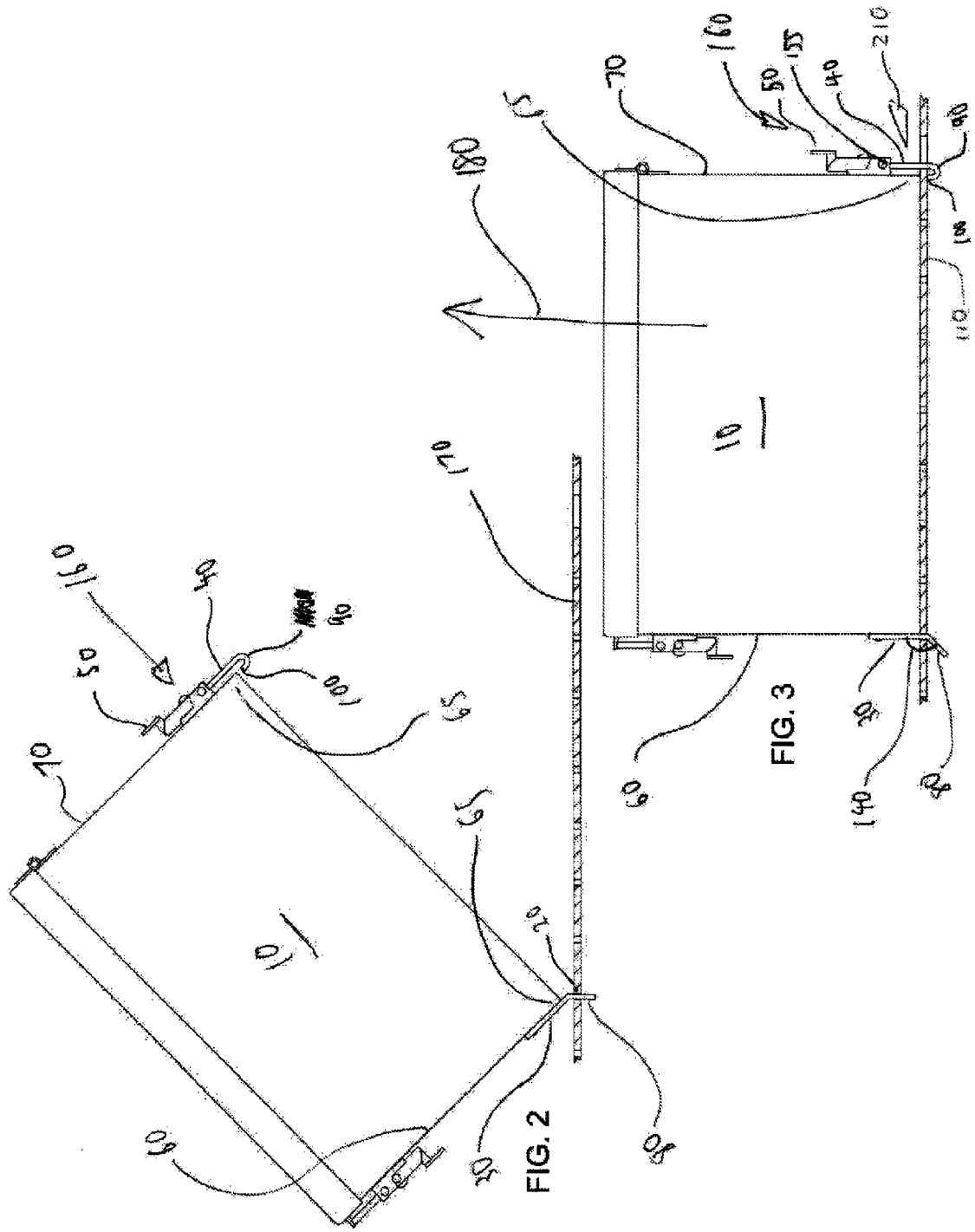

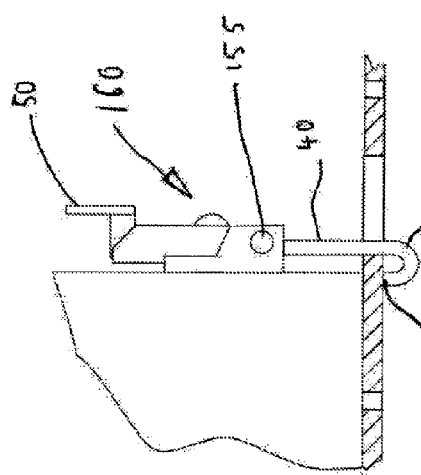
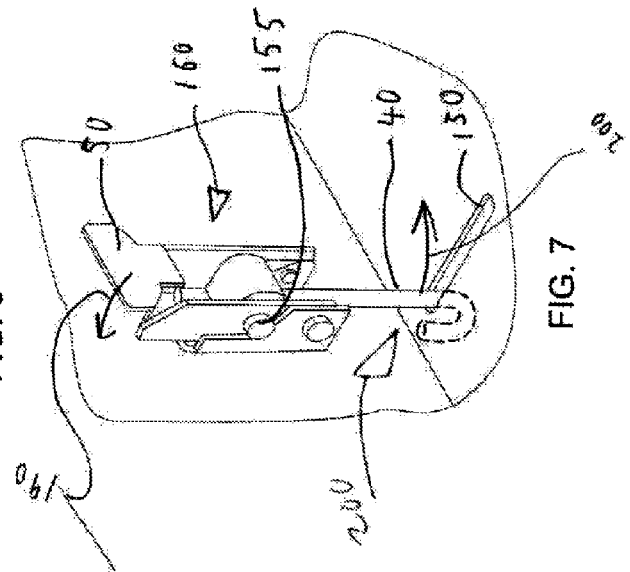
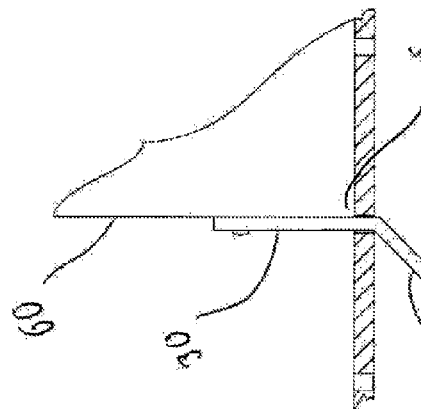
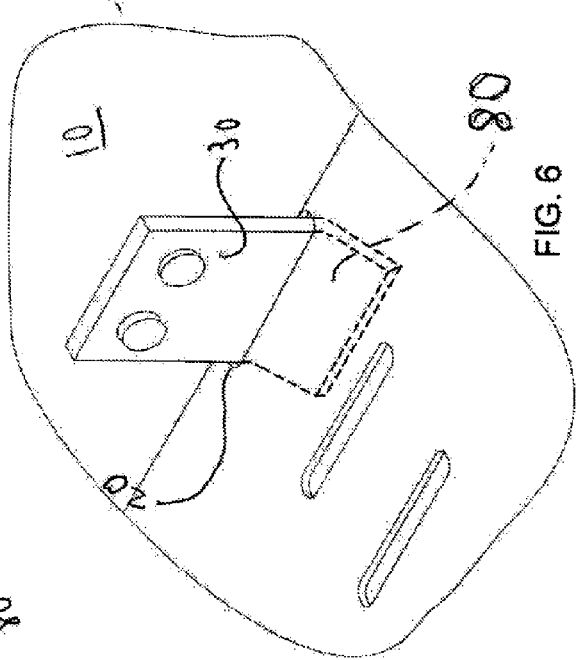

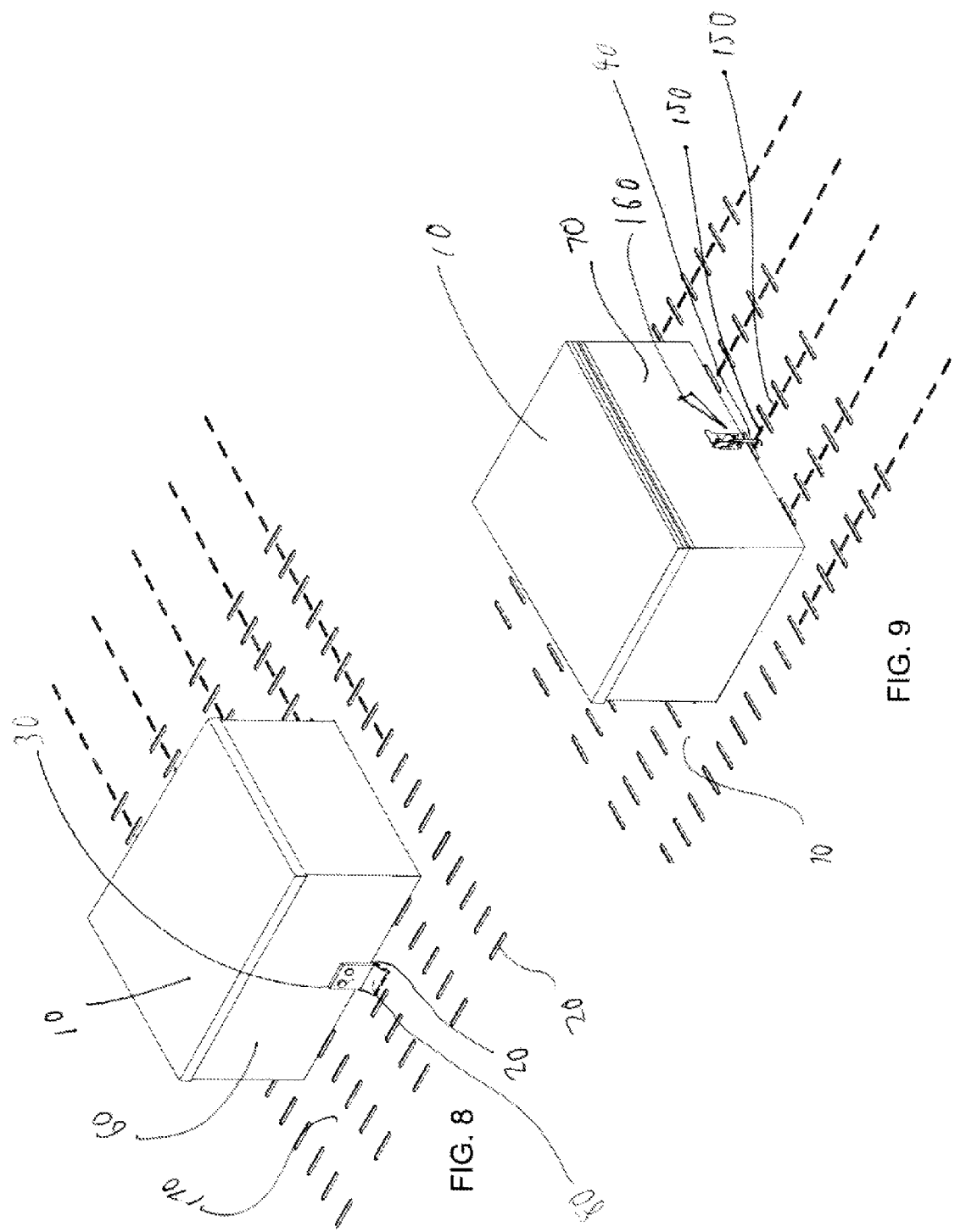

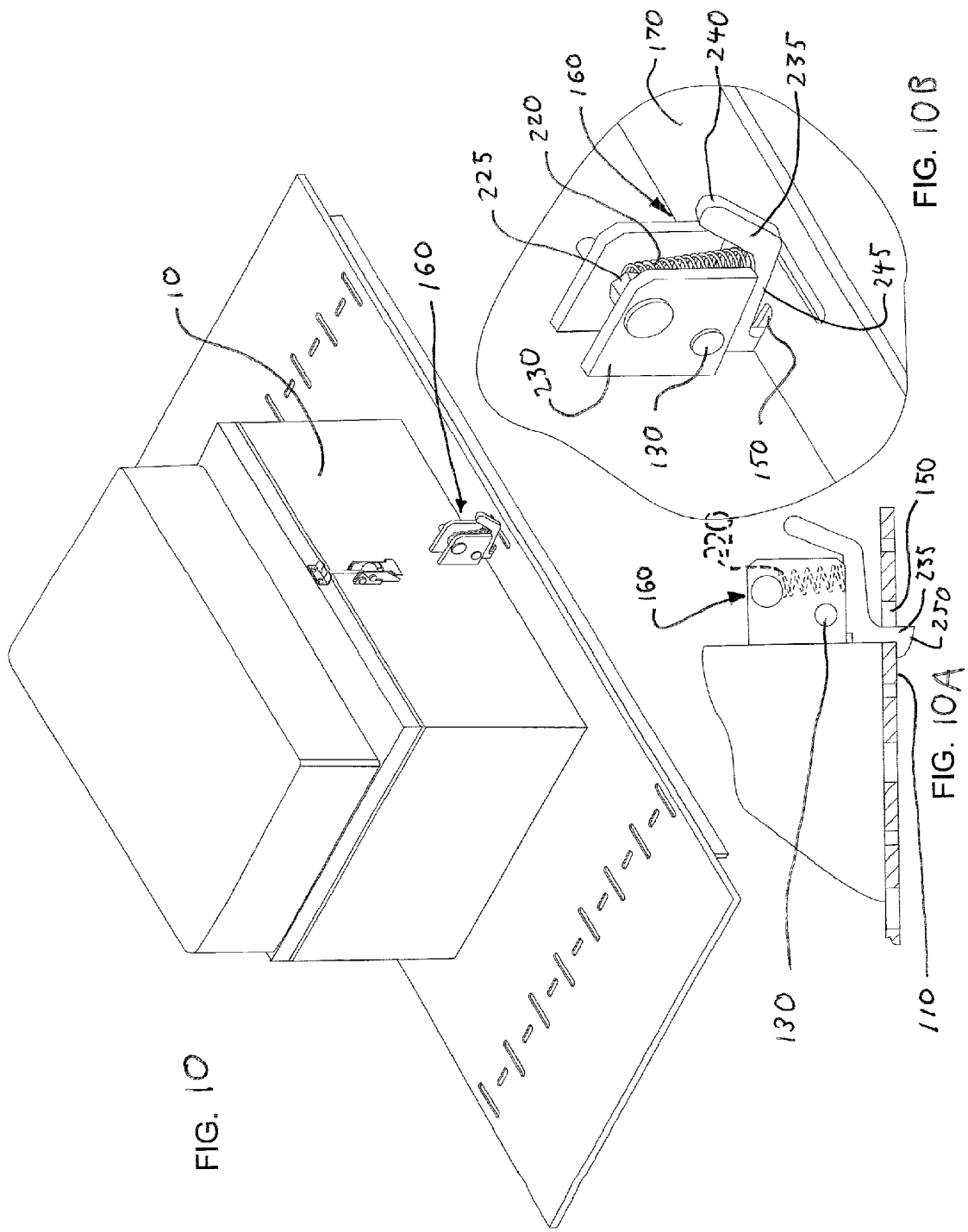

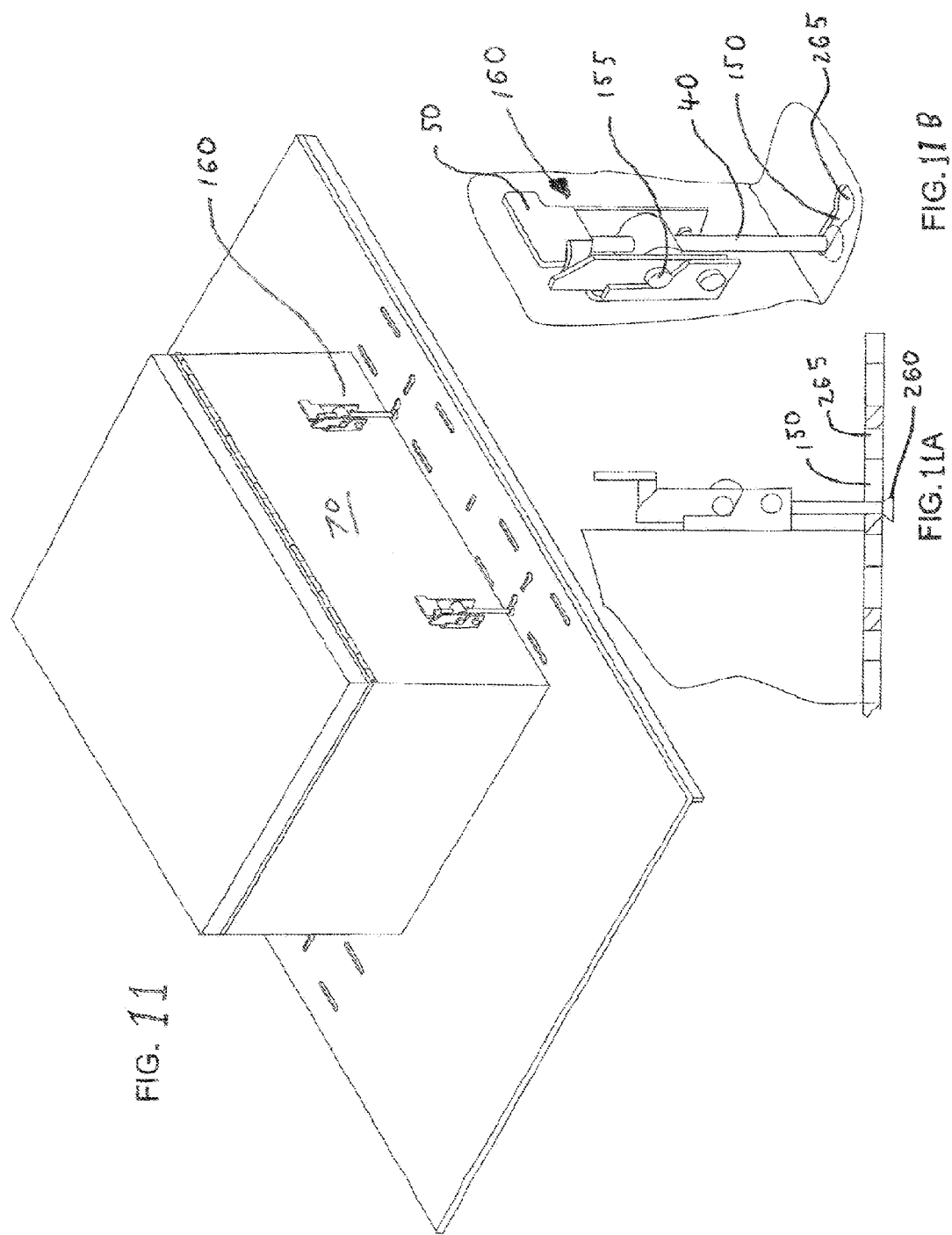

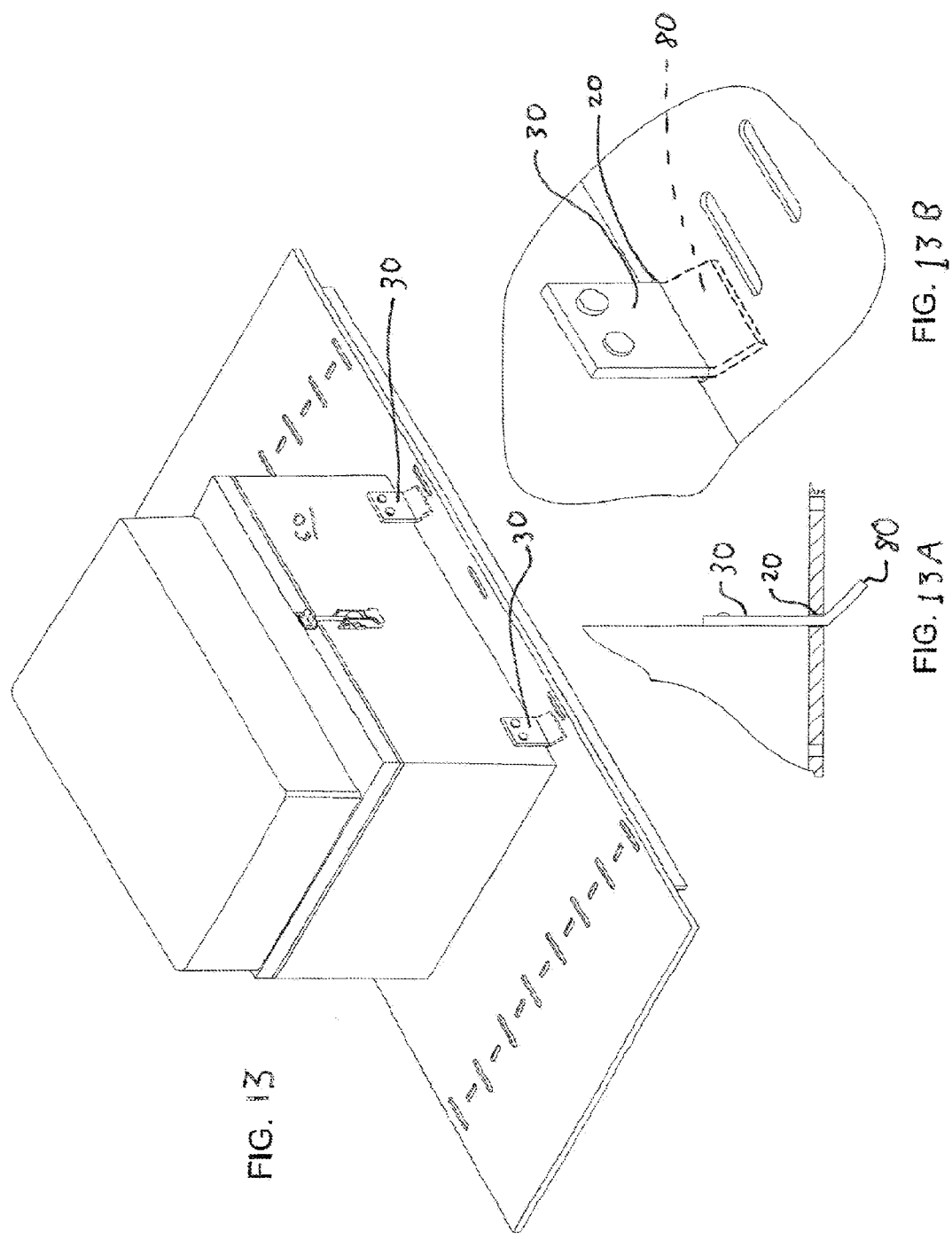

ADJUSTABLE BOAT SEATS AND ACCESSORIES

RELATED APPLICATIONS

This application claims priority to U.S. Provisional Patent Application No. 61/265,742, filed on Dec. 1, 2010.

GOVERNMENT RIGHTS

This invention was not made with Government support. The Government does not have any rights in this invention.

BACKGROUND OF THE INVENTION

Boats typically are purchased with a predetermined number of seats, and a fixed location of seats. However, if there are only one or two people in the boat, and 4 seats, then there may be wasted space occupied by the unused seats. In addition, if there are two or four seats in the boat, and one person in the boat, then the boat would normally be leaning to the right or left if the two or four seats are disposed on the left and right side of the boats.

A company named "Rivtech" has an adjustable boat seating system described at its web site, "http://www.rivtechdriftboats.com/standard-features/adjustable-removable-driftboat. However the seats of this product are secured to a bench that is raised above the floor, and secured to the sides of the boats. The seat can be in a fixed position on the bench, or it may slide on a rail that is on the bench.

As can be seen, there is a need for a boat to have a seat or accessory that is moveable or relocateable to various positions on the floor of the boat to accommodate the number of people in the boat, and the desired space.

There is also a need for a seat or accessory that is removably attached to a floor of a drift boat. The seat being disposed on the floor provides a lower center of gravity, and thus more safety.

There is also a need for a boat to have accessories other than seats, such as counsels, cooler, refrigerators, or containers that are moveable or relocateable about the boat floor.

BRIEF SUMMARY OF THE INVENTION

One aspect of the present invention is a relocateable accessory (10), comprising: the accessory (10) having a front side (60) and a rear side (70); a first extension (30) that extends downwardly to a second extension (80); said first extension (30) secured to said front side (60); a floor (170) having a second extension slot (20), and a finger slot (150); said second extension (80) capable of being disposed through said second extension slot (20); and a locking member (160) secured to said rear side (70), said locking member (160) can bias from a secured position (210) and an unsecured position, and a portion of said locking member (160) is removably displaced through said finger slot (150).

Another aspect of the present invention is a relocateable accessory (10), comprising: a front side (60); a rear side (70) opposed from said front side (60); a first extension (30) secured to a lower edge (65) of said front side (60), said first extension (30) extending downwardly to a second extension (80) that is angled away from said accessory (10) and an angle (140) of about 40 degrees; a locking member (160) secured to a lower edge (65) of said rear side (70), said locking member (160) having a finger (40) that can be biasly disposed through a finger slot (150) of a floor (170), said finger (40) being biasly disposed between a secured position (210) and an unsecured position; and said floor (170) having a second extension slot (20) that is capable of receiving said second extension (20) therethrough.

These and other features, aspects and advantages of the present invention will become better understood with reference to the following drawings, description and claims.

BRIEF DESCRIPTION OF THE DRAWINGS

FIG. 2 is a pictorial view of one embodiment of one step of how the present invention may be installed on a boat.

FIG. 3 is a pictorial view of one embodiment of a second step of how the present invention by be installed on a boat.

FIG. 4 is a pictorial of a first extension and second extension;

FIG. 5 is a pictorial of a locking member;

FIG. 6 is a pictorial view of the second extension disposed through the second extension slots in the floor of the boat;

FIG. 7 is a pictorial view of the locking member with the finger disposed through the finger slot;

FIG. 8 is a pictorial of a portion of an adjustable seat with a front side having a first extension and second extension, whereby the second extension is disposed through the second extension slot;

FIG. 9 is a pictorial view showing an embodiment of an adjustable seat disposed on the boat floor by use of the locking member;

FIGS. 10, 10A, and 10B are pictorials of another embodiment of a locking system of the present invention;

FIGS. 11, 11A, and 11B are pictorials of another embodiment of a locking system of the present invention;

FIGS. 13, 13A, 13B are pictorials of an embodiment with a plurality of first extensions 30 and second extensions 80 on one side of the seat.

DETAILED DESCRIPTION OF THE INVENTION

The following detailed description is of the best currently contemplated modes of carrying out the invention. The description is not to be taken in a limiting sense, but is made merely for illustrating the general principles of the invention, since the scope of the invention is best defined by the appended claims.

Figure 1:
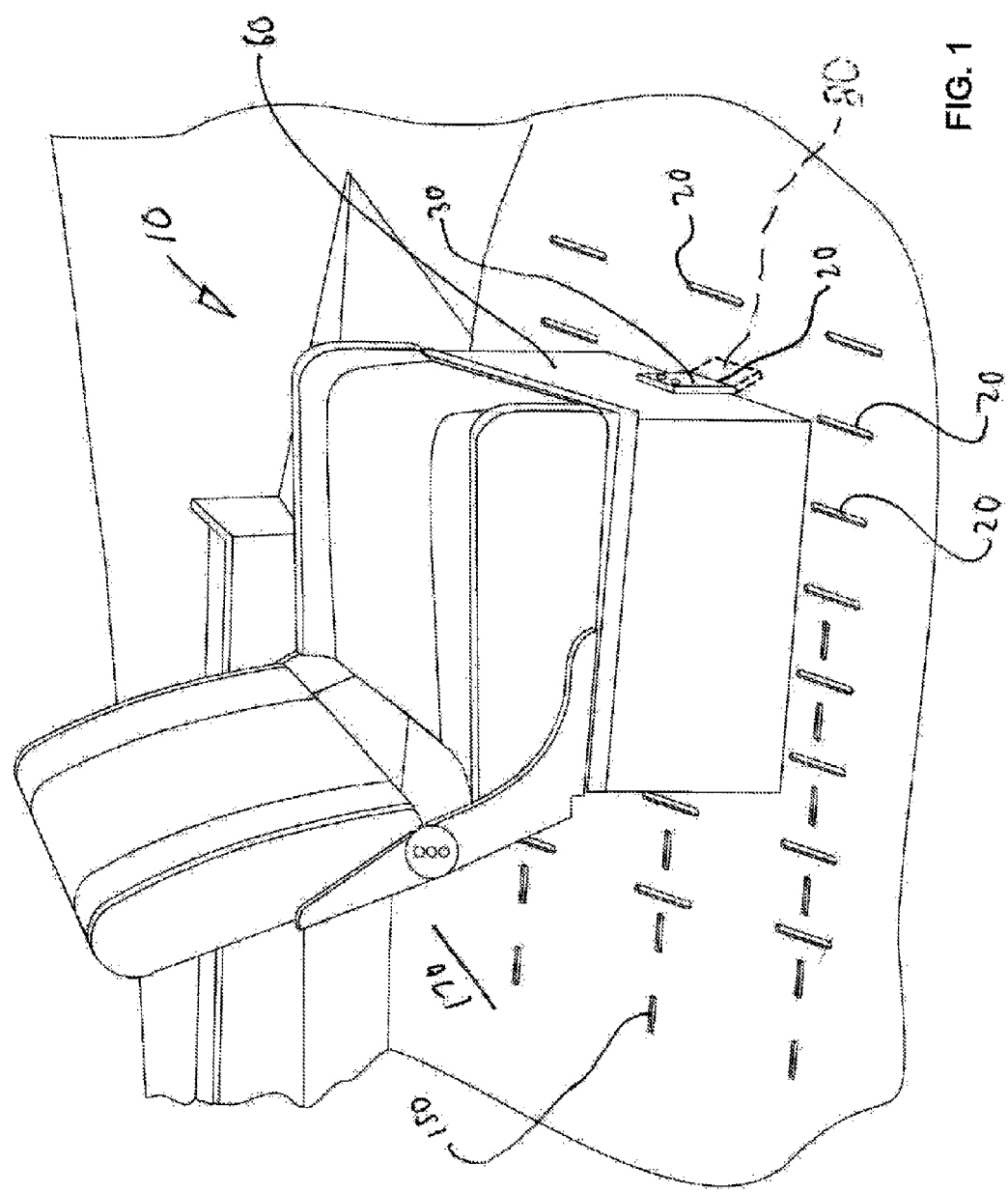
FIG. 1 is a pictorial of one embodiment of the present invention.

REFERENCE NUMERALS 10 adjustable seat
20 second extension slot
30 first extension
40 finger
50 tab
60 front side
65 lower edge
70 rear side
80 second extension
90 hook portion
100 tip
110 bottom side of floor
120 bottom of seat
130 pivot
140 angle between first extension and second extension
150 finger slot
155 finger pivot 160 locking member
170 floor
180 vertical upward force
190 inward direction
200 outward direction
210 secured position of the locking member
220 spring
225 fixed end FIG. 1 illustrates one embodiment on the present invention. A front side 60 may have a first extension 30 that may extend downwardly to a second extension 80. The second extension 80 may be removably disposed through a second extension slot 20. The second extension 80 may extend away from the first extension 30 at an angle 140, as seen in FIG. 3. In one embodiment, that angle 140 may be about 45 degrees. In another embodiment, that angle may be between about 30 degrees to about 60 degrees. Thus, the seat 10 or component 10 cannot be removed solely by a vertical upward force 180.

FIG. 1 also illustrates the floor 170 with the finger slot 150. In one embodiment, the finger slot 150 may be disposed substantially perpendicular to the second extension slot 20.

FIG. 2 illustrates one embodiment of a method of using the present invention 10, and the structure of one embodiment of the present invention 10. A locking member 160 may be disposed on a rear side 70. The locking member 160 may removably secure the seat 10 or component 10 to a floor 170. In one embodiment, the locking member 160 may have a tab 50 that can be displaced inwardly along an inwardly direction 190, which may cause a finger 40 to be displaced outwardly in an outwardly direction 200. The finger 40 may extend downwardly to a hook portion 90. The hook portion 90 may terminate at a tip 100. In one embodiment, the locking member is J-shaped. For example, the finger 40, the hook portion 90, and the tip 100 may be J-shaped. FIG. 3 illustrates a seat 10 or component 10 that is secured to a floor 170. In FIG. 3, the locking member 160 is illustrated in the secured position 210.

As illustrated in FIGS. 3 and 5, in one embodiment, the hook portion 90 and tip 100 may be disposed below the floor 170 when the seat 10 is secured to the floor 170, which is also referred to as the secured position 210. When the seat 10 is secured to the floor 170 in this manner, the locking member 160 is in the secured position 210. In one embodiment, the tab 50 can be displaced inwardly, such as by pushing it with a thumb with enough force to overcome the force of any spring that may biasly push the tab 50 outwardly, or the spring may force the finger 40 inwardly. The locking member 160 is in the unsecured position when the finger 40 is displaced outwardly, then the tip 100 would be displaced outwardly, which would cause the tip 100 from being below the floor 170, to being below or within the finger slot 150 so that the front side 60 of the accessory 10 can be lifted upwardly until the second extension 80 is substantially vertical. At which point the second extension 80 can be lifted through the second extension slot 20. For example, the rear side 70 may be lifted so that the second extension 80 is substantially vertical, so that the second extension 80 can be removed through the second extension slot 20, and then the seat 10 or component 10 can be removed or relocated and repositioned to the floor 170. In one embodiment, the first extension 30 is secured to a lower edge 65 of the front side 60.

As seen in FIGS. 3 and 5, the locking member 160 may have a finger pivot 155 disposed below the tab 50, and above the finger 40 to enable the tab 40 to bias inwardly as the finger 40 biases outwardly. Likewise, the finger pivot 155 may allow the tab 50 to bias outwardly as the finger 40 may bias inwardly. In one embodiment, a spring may exert an outward force above the finger pivot 155, so that the finger 40 has a hook portion 90 secured through a finger slot 150, to secure the seat 10 or component 10 to the floor 170.

As seen in FIGS. 3, 5, and 7, in one embodiment the locking member 160 may have a hook portion 90 that can fit within a finger slot 150, and then the tip 100 of the hook portion 90 may contact the bottom side of the floor 110 to secure the adjustable seat 10 in place. The first extension 30 may have a second extension 80 extending therefrom at an outward angle 140. In one embodiment, this angle is called the angle between the first extension and the second extension 140. In one embodiment, this angle 140 may be about 45 degrees.

Therefore, as seen in FIGS. 2, 4, and 6, in operation, the second extension 80 may be disposed within a slot 20, then the bottom of the seat 120 may be placed on the floor 170, then the hook portion 90 may be placed within the slot 20. The hook portion 90 may be adjusted or manipulated via a tab 50 that can be displaced in one direction, forcing the hook portion 90 to be displaced because of the pivot 130.

FIG. 8 further illustrates the seat 10 or component 10 disposed on a floor 170. The front side 60 is shown having a first extension 30 extending downwardly to a second extension 80, and the second extension 80 and first extension 30 may be disposed whereby there is an angle 140 between them. In one embodiment, this angle 140 may be about 45 degrees. In one embodiment the angle 140 may be between 30 degrees and 60 degrees. The second extension 80 may be removably disposed through the second extension slot 20.

FIG. 9 illustrates the seat 10 or component 10 secured to a floor 170 by means of the locking member 160. The locking member 160 is illustrated in the secured position 210. The locking member 160 may be disposed on the rear side 70. The finger 40 may be removably disposed through the finger slot 150 of the floor 170.

FIGS. 10, 10A, and 10B illustrate another embodiment of the locking member 160. The locking member may pivot about a pivot 130. The pivot 130 of this embodiment may be rotatably disposed to a locking member housing 230. The pivot 130 may be disposed above the floor 170, and beneath a fixed end 225. A spring 220 may be biasly disposed between the fixed end 225 and a lever member 235. In one embodiment the lever member 235 may have a contact portion 240, which a boater's finger may contact to move the locking member 160. The lever member 235 may have a horizontal portion 245 that extends inwardly from the contact portion 240, and the horizontal portion 245 may be immediately adjacent and above the floor 170. The lever member 235 may have a hook portion 250 that extends downwardly from the horizontal portion 245. The hook portion 250 may be able to contact the bottom side of floor 110. For example the spring 220 may force the hook portion 250 against the floor 170 to secure the locking member 160 in place, which also secures the component or seat 10 in place. The seat 10 may be removed by forcing the lever portion 240 upwardly, which displaces the hook portion 250 away from contact with the bottom side of floor 110, so that the lever member 235 may be lifted upwardly through the finger slot 150.

FIGS. 11, 11A, and 11B illustrate another embodiment of a locking member 160, where the finger 40 terminates in an enlarged portion 260, which can be displaced through a finger slot keyhole 265 of the finger slot 150. For example, the enlarged portion 260 may have a diameter smaller then the finger slot keyhole 265, but larger than the width or diameter of the finger slot 150.

Figure 12:
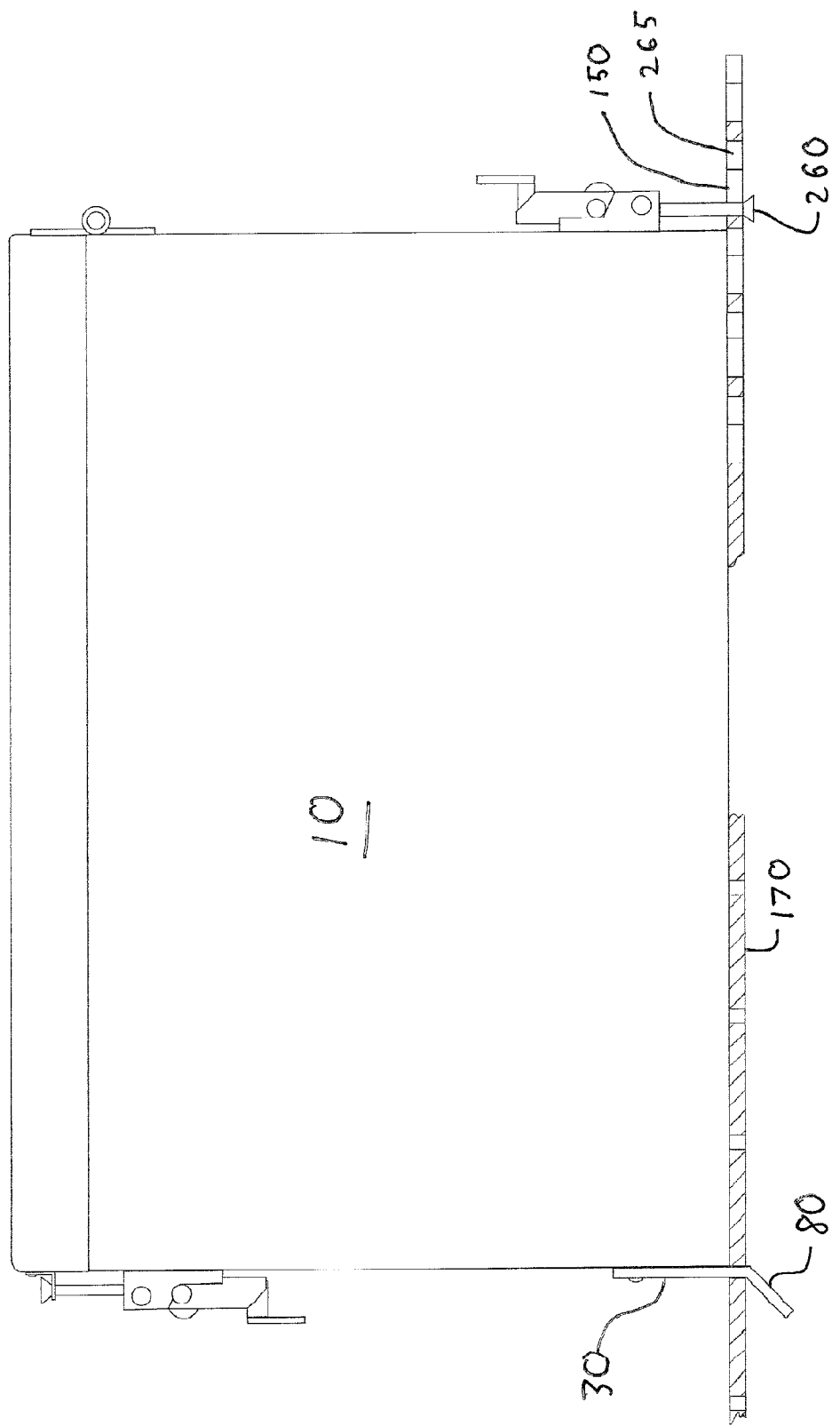
FIG. 12 is a pictorial of the embodiment of the locking system with the enlarged portion.

FIG. 12 illustrates an embodiment of a seat 10 secured to a floor 170 via the locking member 160 with the enlarged portion 260.

FIGS. 13, 13A, and 13B illustrates one embodiment with a plurality of combined first extension 30 and second extensions 80, whereby either the first extension 30 or second extension 80, or the interface of where the first extension 30 meets the second extension 80, may be disposed through the second extension slot 20.

I claim:

1. A relocateable accessory (10) for use with a flat boat floor (170), comprising:
   the accessory (10) having a front side (60) and a rear side (70);
   a first extension (30) that extends downwardly to a second extension (80), said second extension (80) disposed obtusely with respect to said first extension (30) and said second extension (80) extends away from said relocatable accessory (10) and said second extension (80) extends lower than said relocatable accessory;
   said first extension (30) secured to said front side (60);
   said flat boat floor (170) having a plurality of second extension slots (20), and a plurality of finger slots (150);
   said second extension (80) capable of being disposed through said second extension slot (20);
   a locking member (160) secured to said rear side (70);
   said locking member (160) can bias from a secured position (210) and an unsecured position, and an enlarged portion of said locking member (160) is removably displaced through said finger slot (150); and
   whereby said second extension (80) is disposed under said flat boat floor (170) when said relocatable accessory (10) is disposed on said flat boat floor (170).

2. The apparatus if claim 1, further comprising: said locking member (160) has a finger (40) that can be displaced through said flat boat floor (170) from said secured position of the locking member (210) to said unsecured position and the enlarged portion (260) is disposed under said flat boat floor (170) when said relocatable accessory (10) is disposed on said flat boat floor (170).

3. The apparatus of claim 1, further comprising said locking member (160) having a finger (40) pivotally disposed on said locking member (160) via a finger pivot (155), and having a tab (50) connected to said finger pivot (155), said finger (40) having a hook portion (90) that terminates in a tip (100) whereby when said tab (50) is displaced in one direction, said finger (40) is displaced in a second direction, and said locking member (160) is in said secured position (210) when said tip (100) is under said floor (170), and said locking member is in said unsecured position when said tip (100) is not underneath said floor (170).

4. The apparatus of claim 1, wherein said second extension slot (20) is disposed substantially perpendicular to said finger slot (150).

5. The apparatus of claim 1, wherein the locking member (160) pivots about a pivot (130), said pivot (130) is rotatably disposed to a locking member housing (230); a spring (220) biasly disposed between a fixed end (225) and a lever member (235) of said locking member (160); a lever member (235) having a horizontal portion (245) that extends inwardly from the contact portion (240), and said horizontal portion (245) immediately adjacent and above said floor (170); said lever member (235) having a hook portion (250) that extends downwardly from said horizontal portion (245); said hook portion (250) able to contact the bottom side of floor (110); whereby said accessory (10) may be removed by forcing the lever portion (240) upwardly, which displaces the hook portion (250) away from contact with the bottom side of floor (110), so that the lever member (235) may be lifted upwardly through the finger slot (150).

6. The apparatus of claim 1, wherein said enlarged portion of said locking member (160) is removably displaced through said finger slot (150) when said locking member is in the unsecured position.

7. A relocateable accessory (10) for use with a flat boat floor (170), comprising:
   a front side (60);
   a rear side (70) opposed from said front side (60);
   a first extension (30) secured to a lower edge (65) of said front side (60), said first extension (30) extending downwardly to a second extension (80) that is angled away from said accessory (10) at an angle (140);
   said second extension (80) disposed obtusely with respect to said first extension (30) and said second extension (80) extends away from said relocatable accessory (10) and said second extension (80) extends lower than said relocatable accessory;
   a locking member (160) secured to a lower edge (65) of said rear side (70), said locking member (160) having a finger (40) that can be biasly disposed through a finger slot (150) of said flat boat floor (170), said finger (40) being biasly disposed between a secured position (210) and an unsecured position; and
   said flat boat floor (170) having a second extension slot (20) that is capable of receiving said second extension (20) therethrough, whereby said flat boat floor (170) has a plurality of finger slots and second extension slots;
   whereby said second extension (80) is disposed under said flat boat floor (170) when said relocatable accessory (10) is disposed on said flat boat floor (170).

8. The apparatus of claim 7, further comprising said finger (40) can be displaced from said secured position of the locking member (210) to said unsecured position.

9. The apparatus of claim 7, further comprising said locking member (160) having a finger (40) pivotally disposed on said locking member (160) via a finger pivot (155), and having a tab (50) connected to said finger pivot (155) whereby when said tab (50) is displaced in one direction, said finger (40) is displaced in a second direction, and said finger (40) has a hook portion (90) that terminates in a tip (100) so that said tip is under said floor (170) when said finger (40) is in the secured position (210).

10. The apparatus of claim 7, wherein said second extension slot (20) is disposed substantially perpendicular to said finger slot (150).

11. The apparatus of claim 1, further comprising said locking member (160) having a finger (40); said finger (40) terminates in an enlarged portion (260); said enlarged portion can be displaced through a finger slot keyhole (265) of the finger slot (150) to removably secure the accessory (10) to flat boat floor (170).

12. The apparatus of claim 7, wherein an enlarged portion of said locking member (160) is removably displaced through said finger slot (150) when said locking member is in the unsecured position.

* * * * *